Figure 1:
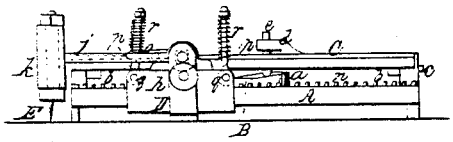
Figure 2:
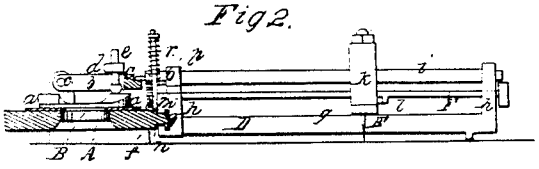
Figure 3:
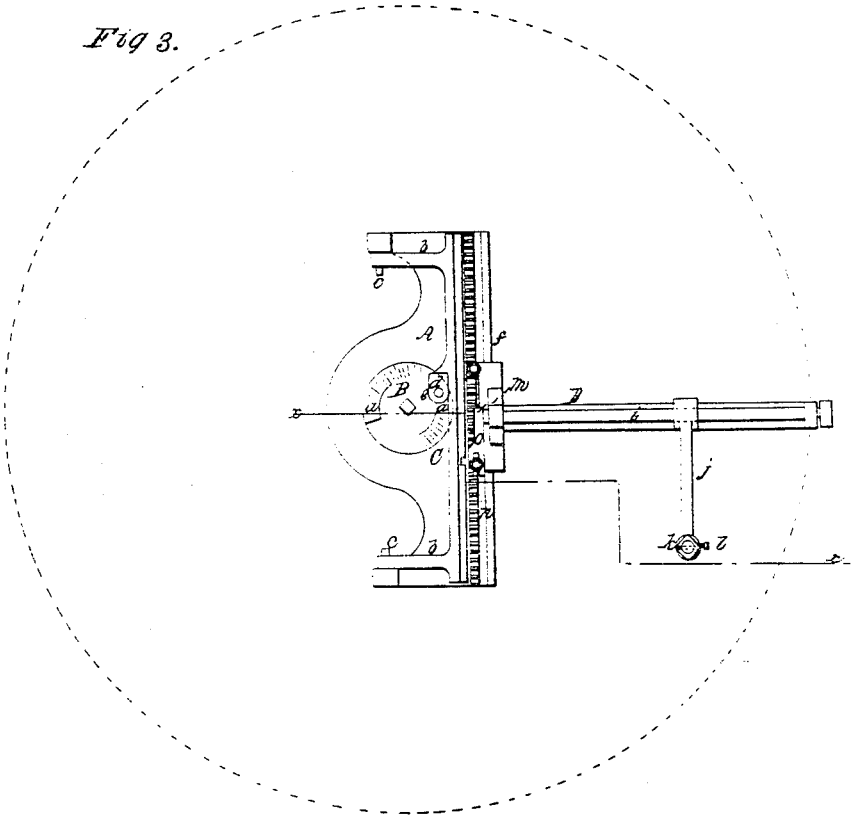

BEST AVAILABLE COPY

S. M. & R. M. Draper,

Dressing Millstones.

No. 230. A. I. Patented Apr. 19, 1859.

Witnesses.
Francis Conant
R. J. F. Conant

Inventor.
Simon M. Draper
Reuben M. Draper

AM. PHOTO-LITHO. CO. N.Y. (OSBORNE'S PROCESS)